Jan. 6, 1953 P. E. CLINGMAN 2,624,596
CRASH PANEL FOR VEHICLES
Filed June 2, 1951

INVENTOR
Paul E. Clingman

By Willits Hardman & Fehr
ATTORNEYS

Patented Jan. 6, 1953

2,624,596

UNITED STATES PATENT OFFICE 2,624,596

CRASH PANEL FOR VEHICLES

Paul E. Clingman, Dayton, Ohio, assignor to General Motors Corporation, Detroit, Mich., a corporation of Delaware Application June 2, 1951, Serial No. 229,575

2 Claims. (Cl. 280—150)

This invention relates to crash panels mounted in a vehicle body in such position as to cushion the impact of an occupant's body thereagainst in the event of a crash or sudden deceleration or other sudden motion of the vehicle. Such crash panels are especially useful in aircraft, military tanks and other military motor vehicles, racing vehicles of all types, and also may be used in trucks and passenger automobiles.

An object of the invention is to provide an efficient form of crash panel which can be very economically made in desired lengths and very simply mounted upon a quite narrow elongated support in the vehicle body.

Other features of this crash panel include: the hollow C-section strip of resilient rubber, or other resilient elastomer material, has a uniform section and hence may be economically molded in long lengths and later cut into any desired shorter lengths; each length thereof may be readily clamped to a narrow base support by a retaining metal plate or plates inserted into the interior of the C-section strip at any location along the length thereof at the time of fixing the crash panel to its support; in the form using a series of spaced retaining plates the C-section of the strips may be materially changed in width and consequently in height, if so desired, at the time of mounting same upon the base support simply by using wider or narrower retaining metal plates therewith. Thus the same original molded section may have its two opposed flanges spread further apart or brought closer together, as may be desired, at the time of mounting same in order to provide a more accurate fit of the crash panel upon a narrow base support or to provide optimum cushioning protection at any particular portion of its length.

Other features of this invention will be apparent from the following description.

Similar reference characters refer to similar parts throughout the several views.

Figure 1:
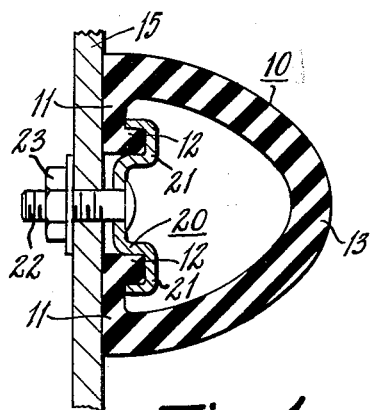
Fig. 1 is a section taken on line 1—1 of Fig. 2, of a short length of a crash panel made according to this invention.
Figure 2:
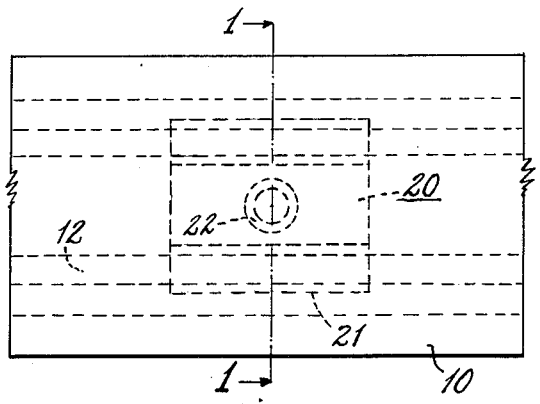
Fig. 2 is a front elevation of the crash panel of Fig. 1.

Referring to Figs. 1 and 2, 10 designates the resilient hollow C-section crash panel strip made of resilient rubber or other suitable well-known elastomer material.

Strip 10 is preferably molded with a uniform cross section and in such long lengths as will be most economical to manufacture per foot of length. Such long lengths can then be cut across at any point to give any desired final length of crash panel. The C-section strip 10 has two opposed in-turned continuous flexible flanges 11 each of which has an enlargement 12 at its tip, all integral with the bulb portion 13 of strip 10 of the same resilient material.

Strip 10 is mounted upon its supporting base 15 by a plurality of spaced metal retaining plates 20 each of which has two opposed channels 21 which grip and partially surround the enlargements 12 on the two opposed flanges 11 and clamp them firmly in place against the base 15 by means of a bolt 22 and outside nut 23. It will be noted that plates 20 can be fitted upon the flanges 11 equally well at all points along the length of strip 10, which greatly facilitates the mounting of strip 10 upon base 15. Due to this feature the holes in base 15 for bolts 22 may be located at the most convenient locations on the vehicle body without requiring any prior location of the clamping plates 20 along the length of strip 10.

In operation, when the occupant's body is thrown against the crash panel in any direction the resilient bulb portion 13 will yield by a partial or complete collapse over a very substantial distance in the direction of the applied force to cushion the blow. Of course the thickness of the walls and the stiffness or hardness of the resilient material of bulb portion 13 should be so chosen as to give the optimum cushioning resistance. The channels 21 of clamping plates 20 will hold only the inner ends 12 of flanges 11 firmly fixed in place and permit all remaining portions of strip 10 to roll upwardly or downwardly by flexing about these fixed ends 12 in the event of a body being thrown thereagainst in an angularly upward or downward direction. This provides a greater amplitude of resilient yielding under the impact of the blow and hence provides a better cushioning effect.

Figure 3:
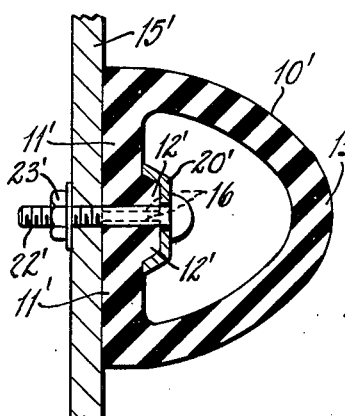
Fig. 3 is a section, taken on line 3—3 of Fig. 4, of a modified form of crash panel.
Figure 4:
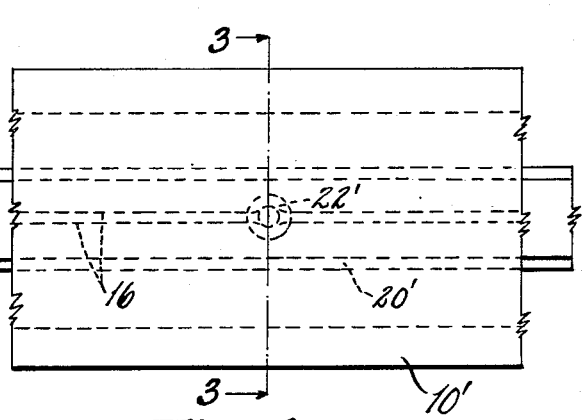
Fig. 4 is a front elevation of the panel of Fig. 3 and shows in dotted lines the continuous metal retaining plate.

In the form of the invention shown in Figs. 3 and 4 the reference numerals with prime marks added designate similar parts to those in Figs. 1 and 2 as described above. In this form the inner edges of flanges 11' are only narrowly spaced apart at the center line of the cross section as shown at 16 in Figs. 3 and 4. The enlargements 12' on flanges 11' are held firmly clamped in place to the base support 15' by the retaining metal plate 20' which extends the full length of the crash panel. The clamping bolts 22' are made sufficiently narrow to lie within the narrow space between flanges 11' preferably by a slight distortion or forcing aside of the flexible material of said flanges. To reduce such distortion bolts 22' may have a flat widened section where they pass thru said narrow space.

This form of crash panel may be readily mounted upon its support 15' by first assembling the retaining plate 20' very loosely in place by bolts 22' and nuts 23', leaving sufficient clearance between plate 20' and support 15' for the enlargements 12' on flanges 11' to be inserted later. Thereafter the strip 10' may be very simply mounted in place by flexing flanges 11' apart sufficiently for the two opposed enlargements 12' to be inserted underneath retaining plate 20', after which nuts 23' are tightened to clamp enlargements 12' firmly fixed in place against support 15'. In this form of the invention only the relatively narrow central portion of the resilient bulbous strip 10' is held fixed in place (by the relatively narrow metal strip 20'), hence all remaining portions of strip 10' is free to stretch or to roll about the fixed portions 12' in an upward or downward angular direction in the event a body is thrown thereagainst in a corresponding angular direction. This permits strip 10' to yield thru a greater distance under the impact of the blow and hence reduces the maximum yielding resisting force necessary to absorb the momentum of the impact.

While the embodiment of the present invention as herein disclosed, constitutes a preferred form, it is to be understood that other forms might be adopted.

What is claimed is as follows:

1. A crash panel adapted to be mounted in a vehicle body in position to protect an occupant in event of a crash, comprising a resilient hollow strip having a cross-section approximating a C-section of elastomer material, the base portion of said C-section having two opposed laterally extending flanges, the adjacent edges of said flanges having inwardly extending enlargements thereon, a metal plate located within the hollow of said C-section strip and having its opposed marginal portions shaped to snugly overlie and partially surround said enlargements to prevent spreading apart of said flanges, and threaded bolts projecting from said metal plate outwardly thru the opening in said C-section strip for fixing said metal plate to a base support and clamping said flange enlargements in fixed position against said base support.

2. A crash panel adapted to be mounted in a vehicle body in position to protect an occupant in event of a crash, comprising a resilient hollow strip having a cross-section approximating a C-section of elastomer material, the base portion of said C-section having two opposed laterally extending flanges, the adjacent edges of said flanges having inwardly extending enlargements thereon, a metal plate located within the hollow of said C-section strip and having its opposed marginal portions shaped to snugly overlie and partially surround said enlargements to prevent spreading apart of said flanges, and means for fixing said metal plate to a base support and for clamping said flange enlargements in fixed position against said base support.

PAUL E. CLINGMAN.

REFERENCES CITED

The following references are of record in the file of this patent:

UNITED STATES PATENTS

| Number | Name | Date |
| --- | --- | --- |
| 1,354,441 | Runyan | Sept. 28, 1920 |
| 2,054,838 | Short | Sept. 22, 1936 |
| 2,070,760 | Straith | Feb. 16, 1937 |
| 2,375,567 | Luton | May 8, 1945 |

FOREIGN PATENTS

| Number | Country | Date |
| --- | --- | --- |
| 769,903 | France | June 18, 1934 |